April 2, 1968

H. KLEIN 3,375,550

PROCESS AND APPARATUS FOR MANUFACTURING REINFORCED PLASTIC TUBING

Filed Oct. 29, 1964

INVENTOR
Heinrich Klein
BY
Michael S. Striker

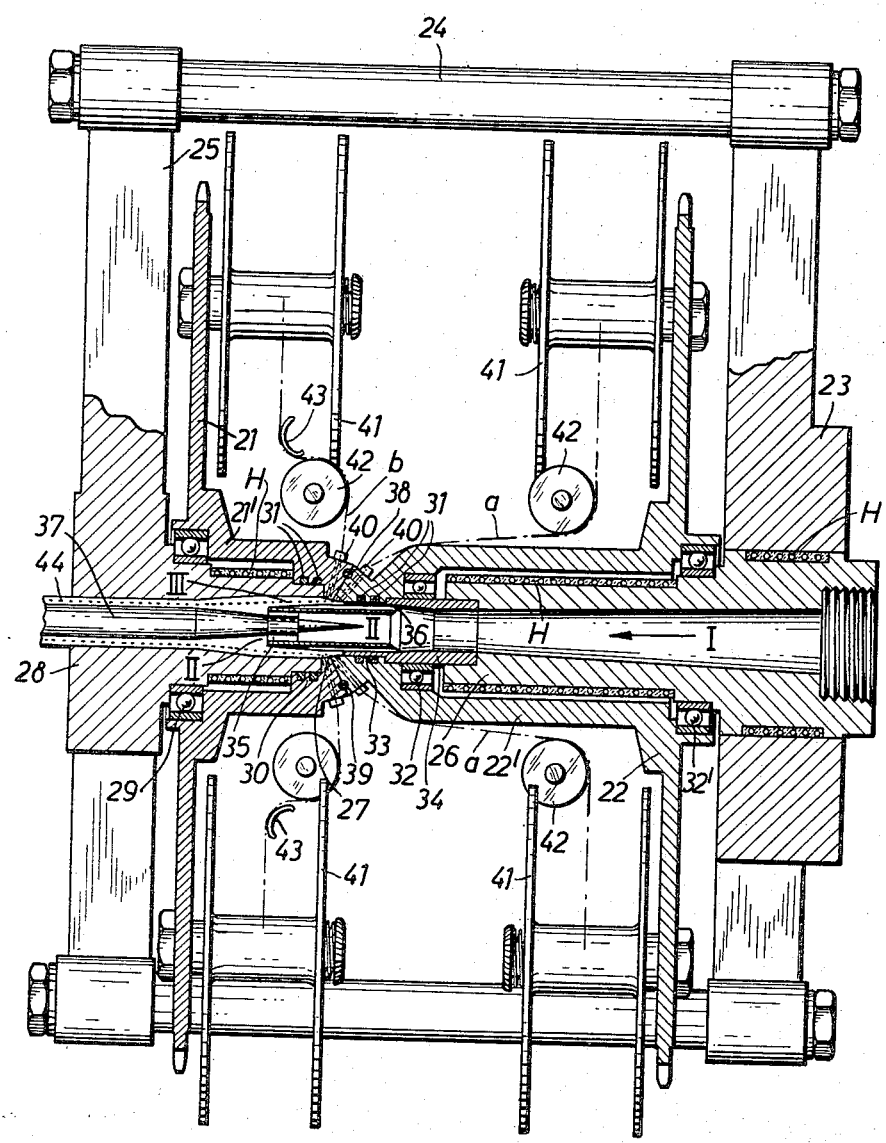

United States Patent Office 3,375,550
Patented Apr. 2, 1968

3,375,550
PROCESS AND APPARATUS FOR MANUFACTURING REINFORCED PLASTIC TUBING
Heinrich Klein, Oberdollendorf, Germany, assignor to Eschweiler Bergwerks-Verein, Kohlscheid, Kreis Aachen, Germany
Filed Oct. 29, 1964, Ser. No. 407,497
7 Claims. (Cl. 18—13)

ABSTRACT OF THE DISCLOSURE

In an apparatus for manufacturing reinforced plastic tubing including elongated nozzle means forming part of an extruder and having a central axis along which the nozzle means divides an elongated body of plastic material into an outer tubular portion and an inner tubular portion which subsequently joins the outer tubular portion to form therewith a plastic tube which issues from the nozzle means, and a pair of means surrounding the nozzle means and introducing into the plastic tube, before the latter issues from the nozzle means, sets of reinforcing filaments in such a manner that they cross each other in the wall of the tubing, each of the pair of the aforementioned means including a plurality of bores distributed about the nozzle axis and the bores of at least one of the aforementioned pair of means communicating with the outer tubular portion of the plastic material to introduce reinforcing filaments into the outer tubular portion and said at least one means being supported for rotation about the nozzle axis to provide helically extending reinforcing filaments.

---

Figure 1:
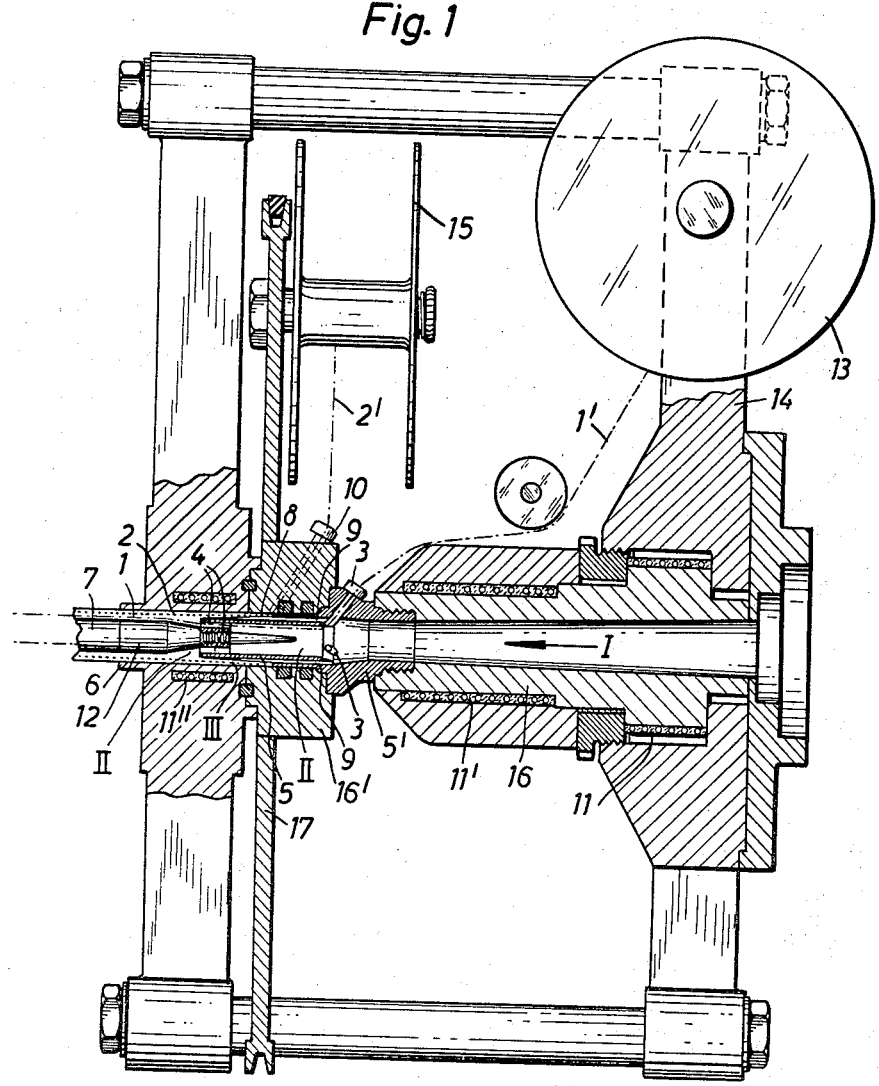

The present invention relates to plastic tubing which is reinforced, and in particular the present invention relates to a process and apparatus for manufacturing reinforced plastic tubing.

A process and apparatus for manufacturing reinforced plastic tubing which has reinforcing filaments embedded in the wall thereof is already disclosed in U.S. Patent 3,004,286.

A primary object of the present invention is to provide a process and apparatus enabling reinforced plastic tubing to have therein reinforcing filaments which are arranged in at least two sets which cross each other in the wall of the plastic tubing.

Another object of the present invention is to provide a process and apparatus which enable the reinforcing of the plastic tubing to take place simultaneously with the manufacture of the plastic tubing in an extruder, for example.

Also, it is an object of the present invention to provide a process and apparatus which enable the reinforcing of the plastic tubing to take place in a fully continuous manner simultaneously with the extruding of the plastic tubing.

Also, it is an object of the present invention to provide a relatively simple compact apparatus which is capable of accomplishing the above objects in a fully reliable manner.

With the above objects in view the invention includes, in a process for manufacturing a reinforced plastic tube, the steps of extruding a plastic tube, and embedding in the wall thereof, before the extrusion is completed, at least two sets of reinforcing filaments while directing these sets of filaments respectively along paths which situate one of the sets of filaments in the wall of the tube in a position extending across the other of the sets of filaments, so that the reinforcing of the tube with the crossed sets of reinforcing filaments is completed by the time the extrusion of the tube is completed.

Also, with the above objects in view, the invention includes, in an apparatus for manufacturing the reinforced plastic tubing, an elongated nozzle means which forms part of an extruder and which has an elongated central axis along which a body of solid plastic material moves, the nozzle means converting the solid body of plastic into a tube of plastic which issues from the nozzle means. A pair of means surround the nozzle means and communicate with the interior thereof through a pair of rows of bores each of which has its bores angularly distributed about the axis of the nozzle means, so that reinforcing filaments can be introduced into the interior of the nozzle means through these bores, and one of the pair of means is supported for rotary movement about the axis of the nozzle means to introduce into the latter a helically arranged set of reinforcing filaments while the other of the pair of means introduces into the plastic material a second set of reinforcing filaments which cross the helical set, and both of the sets of reinforcing filaments become embedded in the wall of the plastic tube spaced from the inner and outer surfaces thereof before the tube issues from the nozzle means.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 1 is a schematic longitudinal sectional elevation of one possible embodiment of a structure according to the present invention capable of performing the process of the invention; and FIG. 2 is a longitudinal schematic sectional elevation of another embodiment of a structure according to the present invention which also operates according to the process of the present invention.

In FIG. 1, those parts which are shown with the dotted-line shading are stationary. As may be seen from FIG. 1, the part of the extruder illustrated therein includes an elongated nozzle means having a rear tubular portion 16 which receives the plastic mass in the form of a solid body I which moves to the left, in the direction of the arrow shown in FIG. 1, through the tubular rear portion 16 of the nozzle means along the central horizontal axis thereof. The elongated nozzle means has a front outlet portion 6 from which a tubular plastic extrusion 7 issues, and with the structure of the invention the wall of the plastic tubing 7 is provided with reinforcing filaments 1 and 2 embedded therein, the reinforcing filaments 1 extending axially in a direction parallel to the axis of the tubing 7, which may be a rigid plastic tube or a flexible hose, for example, while the elongated axially extending reinforcing filaments 1 are surrounded by and in engagement with helically extending reinforcing filaments 2, and the engaging sets of crossing filaments 1 and 2 are situated in the wall of the plastic tubing 7 spaced from the exterior and interior surfaces thereof. The nozzle means includes in addition to the rear tubular portion 16 and the front outlet portion 6 an intermediate nozzle portion 5 which extends between the front portion 6 and rear portion 16 of the nozzle means and which has a rear portion 5' fixed with and forming an extension of the rear tubular nozzle portion 16.

The intermediate tubular nozzle member 5 is connected with an elongated core 12 which tapers toward the rear and which at the front end of the intermediate tubular nozzle member 5 is surrounded by a portion of the latter which is formed with openings 4 through which part of the plastic mass passes. To the rear of the openings 4 the nozzle portion 5 is formed in its tubular wall with passages 9 extending through the wall of the tubular nozzle portion 5, so that the solid plastic mass 1 is divided at the openings 9 into a pair of portions one of which flows along the exterior of the tubular portion 5 of the nozzle to form part of the wall of the final plastic tube 7, while an inner solid portion II continues to flow along the interior of the tubular nozzle portion 5 and out through the openings 4 thereof beyond which this inner portion is spread out and compressed into the outer tubular portion of the plastic mass so as to form the tube 7 which issues from the extruder.

It will be noted that in this way the inner portion II of the mass joins the outer portion III of the mass to form the final tube 7.

In accordance with one of the features of the invention elongated reinforcing filaments 1' are introduced through bores in the rear portion 5' of the nozzle means into the interior of the latter into the still liquid plastic mass while it is in its solid form, and thus it will be seen that these openings for the several reinforcing filaments 1' are in the form of bores 3 annularly distributed about the axis of the nozzle means and passing through the rear portion 5', a suitable inlet guide being provided at the outer end of the bores 3. The several filaments 1' are derived from spools 13 which are mounted on suitable supports for rotation about axes all of which are located in a common plane which is normal to the axis of the nozzle, and these axes of the spools 13 are maintained stationary since the nozzle portion 5 is also stationary, and thus the axially extending reinforcing filaments 1 which are formed from the filaments 1' derived from the spools 13 enter into the mass I in the interior of the nozzle 5 to flow out through the openings 4 thereof together with the mass II so as to be subsequetnly joined with the mass III which surrounds the intermediate nozzle portion 5. On the other hand, a rotary member 16' surrounds the intermediate nozzle portion 5 and is freely rotatable with respect thereto while being fluid-tightly sealed with respect to the intermediate nozzle portion 5 and the front nozzle portion 6, and this rotary member 16' is formed with bores 10 in the form of tubular guides extending through the wall of the rotary member 16' and communicating with the interior nozzle space which surrounds the member 5 at its forward tapered end which becomes of a gradually smaller diameter toward the left, as viewed in FIG. 1, and the several filaments 2' are respectively introduced through the bores 10 onto the part 8 of the exterior surface of nozzle member 5 which is of maximum diameter. The several spools 15 carry the several reinforcing filaments 2' and these spools 15 are supported for free rotary movement about axes which are parallel to the nozzle axis, and the spools 15 are carried by the rotary disc 17 fixed to the rotary member 16' for rotation therewith and forming a pulley which is rotated by any suitable belt, so that the several reinforcing filaments 2' form a set of helical reinforcing filaments 2 which surround the axially extending reinforcing filaments 1.

Once the filaments are threaded into the interior of the nozzle means, the flow of plastic material through the nozzle means will engage the filaments and pull them through the extruder so that the tube 7 issuing from the outlet 6 of the extruder will have the reinforcing elements embedded therein in the manner described above. The compressing of the mass II into the outer mass III displaces the axially extending filaments 1 into engagement with the helically extending filaments 2, and there are no filaments visible at the perfectly smooth interior and exterior surfaces of the extruded tube 7.

Thus, the bores 3 through which the reinforcing filaments 1 are respectively introduced take the form of elongated tubular filament nozzles or bores of relatively small diameter which are inclined as illustrated in FIG. 1 so that the reinforcing filaments 1' are fed into the mass in the same general direction that the mass flows through the extruder, and in the same way it will be noted that the filament introducing nozzles 10 for the several reinforcing filaments 2' are in the form of elongated sleeves of relatively small inner diameter which are also inclined in the general direction of plastic flow toward the outlet of the extruder. The angle of inclination of the filament introducing bores 3 and 10 are preferably between 20 and 60° with respect to the axis of the nozzle.

The plastic mass is of course any thermoplastic material which can conveniently be extruded, and the plastic mass is delivered into the rear nozzle portion 16 in liquid form by a suitable screw which receives the plastic in the form of pellets or the like and which compresses and advances the plastic material through the nozzle means of the extruder. Heating elements 11 of conventional construction are arranged in the nozzle means to maintain the plastic material in the desired condition. With the above-described process and apparatus, the movement of the helical reinforcing filaments 2' along the tapered exterior of the nozzle portion 5 together with the outward compression of the inner mass II into the outer tubular mass III guarantees that the reinforcing filaments 1 and 2 are completely enveloped and embedded in the plastic mass and also guarantees that the axially extending reinforcing filaments 1 engage the helically extending reinforcing filaments 2. The reinforcing filaments 1' or 2', which subsequently become the reinforcing filaments 1 and 2 embedded in the wall of the plastic tubing 7, can take the form of any textile or plastic multi-filaments or monofilaments or they can even take the form of wire which may be in the form of a mono-filament wire or a multi-stranded wire, and if desired these reinforcing filaments can also be in the form of bands or ribbons, so that the term "reinforcing filament" is intended to cover any of these various forms of elongated flexible reinforcing filaments which may be embedded in the plastic tubing.

The intermediate nozzle member 5 has the rear openings 9 thereof arranged along a circle whose center is in the nozzle axis, and it is through these rear openings 9 that part of the plastic mass I flows so as to form the mass III which flows around and completely embeds the helical reinforcing filaments 2 in the plastic mass. Forwardly of the circle of openings 9 the intermediate nozzle portion 5 is formed with the circular row of axially extending openings 4 through which the plastic mass II flows in order to be joined with the surrounding plastic mass III. The heating elements 11 are situated at the rear part of the nozzle means, while the heating elements 11' are situated at an intermediate portion of the nozzle means, and the heating elements 11" are situated at the front of the nozzle means. These heating elements maintain the thermoplastic mass in the form of a liquid stream until it issues from the extruder in the form of the tubing 7, and of course the inner core 12 which is centrally fixed to the intermediate nozzle 5 and has the substantially pointed, tapered right end situated to the right of the openings 4, as shown in FIG. 1, determines the inner diameter of the plastic tubing and also serves to compress the mass II into the outer mass III. Also, it is to be noted that the filament introducing nozzles 3 are not only arranged at an angle of 20-60° with respect to the axis of the nozzle means, but in addition they extend directly into the plastic stream I.

The supply spools 13 mentioned above are supported for rotary movement on stationary arms 14 of the apparatus. It is to be noted that the pulley 17 is situated in a plane which is parallel to the plane which includes the several axes of the several spools 13. Of course, the several axes of the spools 15 extend perpendicularly to the pulley 17.

Once the reinforcing filaments extend into the interior of the nozzle means, the extrusion can be started and the plastic masses I-III will surround and engage the filaments and draw them from the several spools through the nozzle means in the manner described above.

The motor which drives the pulley 17 through a suitable belt is capable of being steplessly adjusted in its speed, so that the helical paths along which the reinforcing elements 2 extend can have their convolutions spaced from each other and extending at a desired angle in the plastic mass, the speed of rotation of the disc 17 of course being adapted to the speed with which the plastic mass moves through the extruder so as to provide helical reinforcing elements 2 of predetermined pitch.

In this way the extrusion of the plastic mass and the simultaneous embedding of reinforcing elements therein takes place in a fully automatic and continuous manner until the supply spools for the reinforcing filaments are exhausted. When this happens, the operations of the extruder are interrupted, and after the supply spools which are empty are replaced by full supply spools of reinforcing filaments, the operations are started again.

With the embodiment of FIG. 2, instead of providing two sets of reinforcing filaments one of which extends axially and the other of which extends helically, two sets of reinforcing filaments are provided where both sets extend helically but respectively in opposite directions.

Referring now to FIG. 2, those parts which turn in a clockwise direction are shown in the cross hatching which extends downwardly toward the right while those parts which turn in a counterclockwise direction are shown in cross hatching which extends downwardly toward the left in FIG. 2, and the stationary parts are shown without any shading.

Referring now to FIG. 2, the structure illustrated therein includes a plurality of arms 23 mounted on the unillustrated head of the extruder press as by being bolted thereto, and the arms 23 are fixed to and extend radially from an elongated rear tubular portion 26 of the nozzle means of FIG. 2, the plastic mass I flowing in liquid form from the extruder screw into the rear nozzle portion 26 in the same way as described above in connection with FIG. 1. Thus, the liquid thermoplastic mass I will flow toward the intermediate nozzle portion 27 where the winding of the reinforcing filaments into the plastic mass takes place.

The structure includes a front nozzle portion 28 from which the plastic tube issues, and this front portion 28 has a plurality of radial extending arms 25 fixed to and extending therefrom and connected by suitable tie-rods 24 with the arms 23. The front nozzle portion 28 supports for rotary movement, by way of bearings such as the roller bearing 29, a spool carrier 21 which thus rotates about the axis of the nozzle means, and at its rear portion the hub 21' of the rotary spool carrier 21 is supported by a suitable slide bearing 30. At the slide bearing 30 suitable sealing rings 31 are provided. The structure includes a rear rotary spool carrier 22 supported for rotation by roller bearings 32 and 32' which surround and are carried by the nozzle means, and the hub 22' of the rotary spool carrier 22 extends along and surrounds the cylindrical portion 33 which is slidably engaged by the rotary front end of the tubular portion 22' of the spool carrier 22, this cylindrical portion 33 forming part of an intermediate nozzle 34 which carries the roller bearing 32, and at the part of the intermediate nozzle portion 33 which is surrounded by the front end of the hub 22' this intermediate nozzle portion 33 is still closed, sealing rings 31' being provided between the rotary spool carrier 22, at its front end, and the cylindrical intermediate nozzle portion 33 to provide a fluid-tight seal therebetween. The intermediate nozzle portion 34 is centrally threaded into the rear nozzle portion 26 so as to form an extension thereof, although, if desired, the rear nozzle portion 26 may be shrunk onto the intermediate nozzle portion 34. This intermediate nozzle portion 34 is provided with two circular rows of openings 35 and 36, and it will be noted that the circle of openings 36, which are distributed about the axis of the nozzle, are situated to the rear of the front axially extending openings 35, so that the openings 36 of FIG. 2 correspond to the openings 9 of FIG. 1 while the openings 35 of FIG. 2 correspond to the openings 4 of FIG. 1. In addition, the intermediate nozzle portion 34 fixedly carries the central core 37 which corresponds to the core 12 of FIG. 1. Thus, the plastic mass I will be divided at the intermediate nozzle portion 33 into an outer tubular plastic mass III surrounding the nozzle portion 33 and flowing axially therealong and into an inner solid mass II which upon flowing through the openings 35 will be spread by the core 37 outwardly into the wall of plastic III to define with the latter the tube which issues from the front end 28 of the extruder.

In the outer tubular mass III which is still in a plastic condition, the reinforcing filaments a and b are introduced while being wound in opposite directions, and of course this introduction of the oppositely wound helical sets of reinforcing filaments a and b takes place at the station 27 just beyond the openings 36 through which part of the mass I flows to form the outer plastic body III, so that with this construction the molten plastic III will flow about and completely surround and engage the helically wound reinforcing filaments to guarantee that the latter are completely embedded within the wall of the extruded plastic tubing.

The diameter of the exterior of the nozzle portion 33 at the region 27 where the reinforcing filaments engage the nozzle 33 is equal to the average diameter of the wall of the plastic tube, so that this diameter is midway between the diameters of the exterior and interior surfaces of the final plastic tube. Subsequent to this part 27 where the reinforcing filaments first enter into the nozzle, the diameter of the exterior surface of the intermediate nozzle portion 33 gradually diminishes, so that this nozzle portion tapers in the same way as the intermediate nozzle portion of FIG. 1, and thus when the inner plastic mass II spreads out and is joined with the outer plastic mass III the sets of oppositely wound reinforcing filaments will be situated midway between the interior and exterior surfaces of the plastic tube. The elongated hubs 21' and 22' of the rotary spool carriers 21 and 22, respectively, respectively terminate in frustoconical faces 38 which are of precisely the same inclination and which slidably engage each other in the manner shown in FIG. 2, and it is to be noted that this interface 38 between the pair of rotary spool carriers surrounds the station 27 where the filaments enter into the interior of the nozzle means. In order to provide a good seal at the interface 38 between the rotary spool carriers, their frustoconical surfaces are respectively formed with annular grooves which are aligned with each other to form a bore surrounding the axis of the nozzle, and in this bore can be situated a sealing ring made of metal or plastic and having a circular or oval cross section.

The reinforcing filaments a and b are introduced into the interior of the nozzle means through the several bores 40 formed by tubular sleeves of small diameter carried by the rotary hubs 21' and 22' adjacent to their frustoconical interface 38 and forming a pair of rows of inlet bores each of which is arranged along a circle surrounding the nozzle axis with one of the rows 40 located on one side of the surface 38 and the other of the rows of inlet nozzles 40 located on the other side of the interface 38 closely adjacent thereto, as indicated in FIG. 2, and these inlets 40 may also have an inclination of 20–60° with respect to the nozzle axis while being inclined in the general direction of plastic flow through the nozzle means toward the left, as viewed in FIG. 2. In this way the reinforcing filaments a and b, which may be in the form of yarns or wires, as pointed out above, enter in a substantially tangential direction into the area 27 so as to be wound thereon about the nozzle portion 34. Of course, the rotary spool carriers 21 and 22 are turned in opposed directions by any suitable drives such as suitable chain-and-sprocket drives, and the spools 41 are supported for rotation by the carrier 21 with the axes of the spools 41 extending parallel to the nozzle axis, while the spools 41 carried by the spool carrier 22 are also arranged so as to extend with axes parallel to the nozzle axis.

The frustoconical interface 38 has an inclination which is substantially midway between the inclination of a cone which includes the axes of the bores 40 for the reinforcing filaments b and a cone which includes the axes of the bores 40 for the reinforcing filaments a. The reinforcing filaments a and b are drawn from the supply spools 41 over the guide rollers 42 which are supported for rotation by any suitable structure and these filaments engage elements such as the brake elements 43 which maintain a certain tension in the filaments as they are advanced into the nozzle means to be drawn with the plastic mass through the nozzle means. The completed sets of crossed helical reinforcing filaments are embedded in the hose or tube 44 and pass with the latter between the core 37 and the inner surface of the outer nozzle member 28.

Although it has not been illustrated for the sake of clarity, it is apparent that the embodiments of FIGS. 1 and 2 may be combined together by a person skilled in the art in such a way that the axially extending reinforcing filaments 1 of FIG. 1 may be combined with two sets of oppositely wound helical reinforcing filaments as derived with the embodiment of FIG. 2.

In all of the above-described embodiments, the axes of the bores through which the reinforcing filaments enter into the nozzles are respectively situated in planes which include the nozzle axis.

It will be understood that each of the elements described above, or two or more together, may also find a useful application in other types of reinforced plastic tubing differing from the types described above.

While the invention has been illustrated and described as embodied in process and apparatus for manufacturing reinforced plastic tubing, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In an apparatus for manufacturing reinforced plastic tubing, in combination, elongated nozzle means forming part of an extruder and having an elongated central axis along which said nozzle means divides an elongated body of solid plastic into an outer tubular portion and an inner tubular portion which subsequently joins said outer tubular portion to form therewith a plastic tube which issues from said nozzle means; and a pair of means surrounding said nozzle means and introducing into said plastic tube before the latter issues from said nozzle means sets of reinforcing filaments which cross each other in the wall of said tubing, one of said pair of means including a plurality of bores distibuted about said nozzle axis and communicating with said outer portion of the plastic material to introduce reinforcing elements into said outer portion of plastic material, and said one means being supported for rotation about the nozzle axis to provide helically extending reinforcing filaments, and the other of said pair of means being stationary and including a plurality of bores distributed about said axis and communicating with the inner body of plastic which subsequently joins said outer portion, said other means introducing into the plastic filaments which extend longitudinally of the plastic tube parallel to the axis thereof and distributed about said axis.

2. In an apparatus for manufacturing reinforced plastic tubing, in combination, elongated nozzle means forming part of an extruder and having a central axis along which said nozzle means divides an elongated body of plastic material into an outer tubular portion and an inner tubular portion which subsequently joins said outer tubular portion to form therewith a plastic tube which issues from said nozzle means; and a pair of means surrounding said nozzle means and introducing into the plastic tube before the latter issues from said nozzle means sets of reinforcing filaments in such a manner that they cross each other in the wall of said tubing, each of said pair of means including a plurality of bores distributed about the nozzle axis and the bores of at least one of said pair of means communicating with said outer tubular portion of the plastic material to introduce reinforcing filaments into said outer portion and said at least one means being supported for rotation about the nozzle axis to provide helically extending reinforcing filaments, said inner tubular portion joining said outer tubular portion downstream of the point where said bores of said at least one means communicate with said outer tubular portion.

3. In an apparatus as recited in claim 2, wherein both of said pair of means are supported on said nozzle means for rotation about said axis and wherein said plurality of bores of each of said pair of means communicate with said outer tubular portion of the plastic material to introduce reinforcing filaments into said outer tubular portion.

4. In an apparatus for manufacturing reinforced plastic tubing, in combination, elongated nozzle means forming part of an extruder and having an elongated central axis along which a plastic body is converted by said nozzle means into a plastic tube which issues from said nozzle means; a pair of means surrounding and rotatable with respect to said nozzle means for introducing into the wall of the plastic tubing before the latter issues from said nozzle means a pair of oppositely directed sets of helically extending reinforcing filaments, said pair of means having rotary portions closely surrounding said nozzle means and formed with bores distributed about the axis of said nozzle means and communicating with the interior thereof for introducing the filaments into said nozzle means, and said rotary portions of said pair of means respectively having frustoconical surfaces of the same inclination slidably engaging each other for providing a fluid-tight engagement between said pair of means while freeing the latter for rotation in opposite directions, respectively, said pair of frustoconical surfaces being respectively formed with annular groups which are aligned with each other to cooperate together to form an annular bore; and a sealing ring situated in said bore.

5. In an apparatus for manufacturing reinforced plastic tubing, in combination, elongated nozzle means forming part of an extruder and having an elongated central axis along which a plastic body is converted by said nozzle means into a plastic tube which issues from said nozzle means; and a pair of means surrounding and rotatable with respect to said nozzle means for introducing into the wall of the plastic tubing before the latter issues from said nozzle means a pair of oppositely directed sets of helically extending reinforcing filaments, said pair of means having rotary portions closely surrounding said nozzle means and formed with bores distributed about the axis of said nozzle means and communicating with the iterior thereof for introducing the filaments into said nozzle means, and said rotary portions of said pair of means respectively having frustoconical surfaces of the same inclination slidably engaging each other for providing a fluid-tight engagement between said pair of means while freeing the latter for rotation in opposite directions, respectively, said nozzle means having a front outlet portion and a rear tubular portion communicating with said front outlet portion, and said pair of means being respectively supported for rotary movement about said front outlet portion and said tubular portion of said nozzle means.

6. In an apparatus for manufacturing reinforced plastic tubing, in combination, elongated nozzle means forming part of an extruder and having an elongated central axis along which a plastic body is converted by said nozzle means into a plastic tube which issues from said nozzle means; and a pair of means surrounding and rotatable with respect to said nozzle means for introducing into the wall of the plastic tubing before the latter issues from said nozzle means a pair of oppositely directed sets of helically extending reinforcing filaments, said pair of means having rotary portions closely surrounding said nozzle means and formed with bores distributed about the axis of said nozzle means and communicating with the interior thereof for introducing the filaments into said nozzle means, and said rotary portions of said pair of means respectively having frustoconical surfaces of the same inclination slidably engaging each other for providing a fluid-tight engagement between said pair of means while freeing the latter for rotation in opposite directions, respectively, said bores of each rotary portion of each of said pair of means being situated adjacent said frustoconical surface of each rotary portion.

7. In an apparatus as recited in claim 6, said bores making an angle of between 20 and 60° with respect to the axis of said nozzle means.

References Cited

UNITED STATES PATENTS

| 1,904,197 | 3/1933 | Bond | 18—13 X |
| 2,491,152 | 12/1949 | Beidle. | |
| 2,800,683 | 7/1957 | Teichmann | 18—13 |
| 2,933,762 | 4/1960 | Pumphrey | 18—13 |
| 3,289,250 | 12/1966 | Zernay | 18—13 |
| 3,004,286 | 10/1961 | Klein | 18—13 |

FOREIGN PATENTS 627,326   10/1961   Italy.

WILLIAM J. STEPHENSON, *Primary Examiner.*

ROBERT F. WHITE, *Examiner.*

R. KUCIA, *Assistant Examiner.*